(12) United States Patent
Kaipio et al.

(10) Patent No.: US 7,274,766 B2
(45) Date of Patent: Sep. 25, 2007

(54) METHOD AND ARRANGEMENT FOR THREE-DIMENSIONAL MEDICAL X-RAY IMAGING

(75) Inventors: Jari Kaipio, Kuopio (FI); Samuli Siltanen, Helsinki (FI); Martti Kalke, Tuusula (FI); Ville Petteri Kolehmainen, Kuopio (FI); Matti Lassas, Helsinki (FI)

(73) Assignee: Instrumentarium Corporation (FI)

( * ) Notice: Subject to any disclaimer, the term of this patent is extended or adjusted under 35 U.S.C. 154(b) by 386 days.

(21) Appl. No.: 11/026,526

(22) Filed: Dec. 30, 2004

(65) Prior Publication Data

US 2006/0146982 A1 Jul. 6, 2006

(51) Int. Cl.
*H05G 1/60* (2006.01)

(52) U.S. Cl. .................. 378/22; 378/4; 378/39

(58) Field of Classification Search .......... 378/4, 378/210, 910, 22, 39, 901
See application file for complete search history.

(56) References Cited

U.S. PATENT DOCUMENTS 7,215,730 B2 * 5/2007 Kalke et al. .................. 378/4
2005/0270024 A1 * 12/2005 Lin ............................ 324/307

OTHER PUBLICATIONS

Delaney et al., Globally Convergent Edge-Preserving Regularizated Reconstruction: An application to limited -angle tomography, IEEE Transactions on image processing, vol. 7, No. 2, Feb. 1998, pp. 204-221.*

Kolehmainen et al., Statistical inversion for medical x-ray tomography with few radiographs: II. Application to dental radiology, Phys. Med. Biol., 48, 2003, pp. 1465-1490.*

Hielscher et al., Gradient-based iterative image reconstruction scheme for time-resolved optical tomography, IEEE transactions on Medical Imaging, vol. 18, No. 3, Mar. 1999, pp. 262-271.*

* cited by examiner

*Primary Examiner*—Edward J. Glick
*Assistant Examiner*—John M Corbett
(74) *Attorney, Agent, or Firm*—Andrus, Sceales, Starke & Sawall, LLP

(57) ABSTRACT

This invention relates to a medical X-ray device arrangement for producing three-dimensional information of an object in a medical X-ray imaging, the medical X-ray device arrangement comprising an X-ray source for X-radiating the object from at least two different directions and a detector for detecting the X-radiation to form projection data of the object. The medical X-ray device (5) arrangement comprises means (15) for utilizing said projection data in a regularized reconstruction method based on solving the non-linear evolution equation $$\partial_t \phi(x,t) = -h(x,t)A^*(A(f(\phi(x,t)))-m) + \alpha P \phi(x,t)$$

to produce three-dimensional information of the object, x representing the coordinates inside the object under imaging, t representing time, $\phi$ representing a level set function indicating the boundary of the object, h representing a positive-valued function, m representing projection data, the operator A representing the X-radiation attenuation model, $A^*$ representing the backprojection operator of A, $\alpha$ representing a positive number, P representing high pass filtering, and f representing a cut-off function returning zero for non-positive arguments and positive values for positive arguments.

30 Claims, 9 Drawing Sheets

Tomosynthesis　　Invention

METHOD AND ARRANGEMENT FOR THREE-DIMENSIONAL MEDICAL X-RAY IMAGING

BACKGROUND AND SUMMARY

Three-dimensional X-ray imaging is based on taking several one-dimensional (1D) or two-dimensional (2D) projection images of a three-dimensional (3D) body from different directions. If 1D projection images are available from all around a 2D slice of the body with dense angular sampling, the inner structure of the slice can be determined. This is known as Computerized Tomography (CT) imaging technology, which is widely used in medicine today. A crucial part of CT technology is the reconstruction algorithm taking the X-ray images as argument and producing a voxel representation of the 3D body.

A collection of X-ray images of a 3D body is called sparse projection data if (a) the images are taken from a limited angle of view or (b) there is only a small number of images. Sparse projection data does not contain sufficient information to completely describe the 3D body. However, in many practical imaging situations only sparse projection data is available.

Traditional reconstruction algorithms such as filtered backprojection (FBP), Fourier reconstruction (FR) or algebraic reconstruction technique (ART) do not give satisfactory reconstructions from sparse projection data. Reasons for this include requirement for dense full-angle sampling of data and difficulty to use a priori information, for example nonnegativity of the X-ray attenuation coefficient. In the case of limited-angle data, tomosynthesis can be applied to produce reconstructions of the body along 2D slices through the body. However, the tomosynthetic slices suffer from blurring that severely compromises image quality.

BRIEF DESCRIPTION OF THE INVENTION

The aim of the invention is to overcome the problems met in 3D reconstruction of an object that occur when using traditional reconstruction algorithms with sparse projection data. This is achieved by a method for producing three-dimensional information of an object in medical X-ray imaging in which method the object is X-radiated from at least two different directions and the said X-radiation is detected to form projection data of the object. Said projection data is utilized in a regularized reconstruction method based on solving the non-linear evolution equation $$\partial_t \phi(x,t) = -h(x,t) A^*(A(f(\phi(x,t))) - m) + \alpha P \phi(x,t)$$

to produce three-dimensional information of the object, x representing the coordinates inside the two- or three-dimensional object under imaging, t representing time, φ representing a level set function indicating the boundary of the object, h representing a positive-valued function, m representing projection data, the operator A representing the X-radiation attenuation model, A* representing the backprojection operator, α representing a positive number, P representing high-pass filtering, and f representing a cut-off function returning zero for non-positive arguments and positive values for positive arguments.

The invention also relates to a medical X-ray device arrangement for producing three-dimensional information of an object in medical X-ray imaging, the medical X-ray device arrangement comprising an X-ray source for X-radiating the object from at least two different directions and a detector for detecting the X-radiation to form projection data of the object. The medical X-ray device arrangement comprises means for utilizing said projection data in a regularized reconstruction method based on solving the non-linear evolution equation $$\partial_t \phi(x,t) = -h(x,t) A^*(A(f(\phi(x,t))) - m) + \alpha P \phi(x,t)$$

to produce three-dimensional information of the object, x representing the coordinates inside the two- or three-dimensional object under imaging, t representing time, φ representing a level set function indicating the boundary of the object, h representing a positive-valued function, m representing projection data, the operator A representing the X-radiation attenuation model, A* representing the backprojection operator, α representing a positive number, P representing high-pass filtering, and f representing a cut-off function returning zero for non-positive arguments and positive values for positive arguments.

In the invention, projection data is a collection of images, where each image is either (i) a traditional projection image taken with X-ray source, object and detector stationary, (ii) scanned projection image taken with moving X-ray source, moving detector and moving detector pixels to form an image, or (iii) a tomosynthetic slice achieved by moving the X-ray source, object, and/or detector during the exposure for emphasizing some sharp layer inside the object and blurring other layers. For example, a panoramic dental X-ray imaging device produces a tomosynthetic slice with sharp layer along the dental arc.

The solution φ(x,T) at fixed time T>0 can be used in at least two ways. Either (a) the function f(φ(x,T)) represents the object image vector, which comprises values of the X-ray attenuation coefficient, or (b) the function φ indicates the interface φ(x,T)=0 between empty space and object. In other words the interface between empty space and object means the boundary of the object.

Benefits of the invention over conventional CT reconstruction include reduced artifacts, possibility to minimize radiation dose to the patient by taking fewer projections without compromising image quality, and usability of any collection of projection data in the reconstruction, enabling three-dimensional X-ray imaging with any X-ray source and digital detector. Benefits of the invention over tomosynthesis include reduced artifacts, improved contrast and improved image quality.

BRIEF DESCRIPTION OF THE DRAWINGS

FIGS. 2A-2B show two kinds of data.

2A: scanned projection image, where a narrow detector moves during exposure to form a projection image.

2B: tomosynthetic slice where X-ray source and detector move during exposure to form a sharp layer inside the object.

FIGS. 3A-3D show different types of projection data. Every black dot represents a location of the X-ray source for taking one projection image.

3A: dense full-angle data. 3B: dense limited-angle data. 3C: sparse full-angle data. 3D: sparse limited-angle data.

DETAILED DESCRIPTION

In practical imaging situations X-ray images are not always available from all around the body. The body might be visible only from certain directions due to imaging geometry. For example this is the case in intraoral dental imaging with the detector inside the patient's mouth. This situation is called limited-angle tomography. Also, even when imaging from all around the body, the number of radiographs should be minimized in medical applications for reducing the X-ray dose of the patient and shortening the time needed for imaging. Such situations lead to sparse projection data.

In the preferred embodiments of the invention a regularized inversion algorithm is used to create a new type of 3D medical X-ray imaging using sparse projection data as input. This new imaging is intermediate between a projection radiograph and a full CT scan.

A regularized reconstruction method, as opposed to a general reconstruction method, produces reconstructions from given measurement data that are not sensitive to measurement noise. Regularization is very important in the reconstruction of an object from sparse projection data since said object is not completely specified by the data alone and a non-regularized reconstruction method is likely to produce reconstructions that are extremely sensitive to measurement noise.

Figure 1:
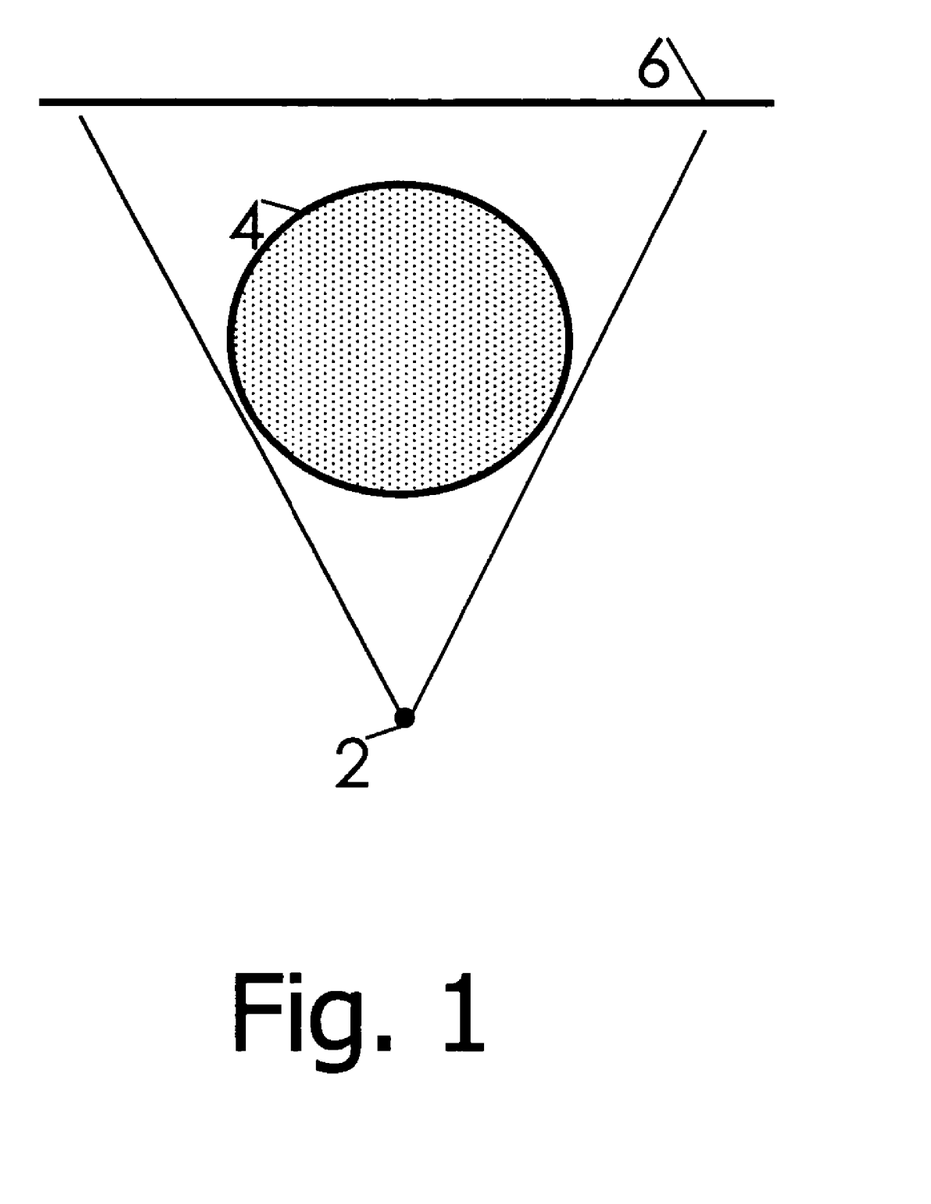
FIG. 1 shows the acquisition of a traditional X-ray projection image.

In FIG. 1 is shown a simple example of X-ray imaging, where an X-ray source 2 is placed on one side of an object 4 under imaging. Radiation passes through the object and is detected by a detector 6 on the other side. The X-ray source is for example a X-ray source of an intraoral X-ray source of a dentist, of a dental panoramic X-ray device, of a surgical C-arm X-ray device, of a mammography device, of a CT scanner or of any other medical X-ray device and the detector 6 is a detector of some of those devices. Usually the detector 6 is a digital sensor that can be thought of as a 2D array of almost point-like detectors.

The 3D body under imaging is modeled by nonnegative X-ray attenuation coefficient g. The value gives the relative intensity loss of the X-ray travelling within a small distance dx:

$$\frac{dI}{I} = -g(x)dx \qquad (21)$$

The X-radiation has initial intensity $I_0$ when entering the object 4 and a smaller intensity $I_1$ when exiting the object. The following equation shows the attenuation law:

$$\int_L g(x)dx = -\int_L \frac{I'(x)}{I(x)}dx = \log I_0 - \log I_1 \qquad (22)$$

where initial intensity $I_0$ is known by calibration, and intensity after object $I_1$ is known from the corresponding point value in a projection image. Thus one pixel value in the measured data represents (i) the integral of g along one line L in case of a projection image.

In the above model it is not taken into account scattering phenomena resulting in X-rays changing their direction, or the dependency of attenuation on the X-ray spectrum resulting in low-energy photons being more easily attenuated than high-energy ones.

Figure 3A:
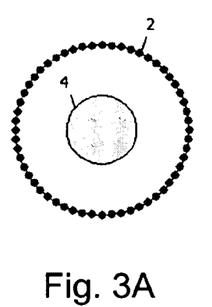
Figure 3B:
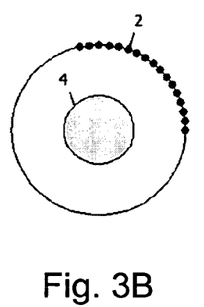
Figure 3C:
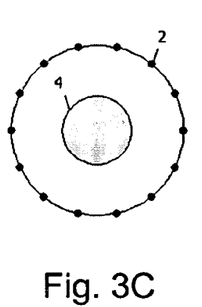
Figure 3D:
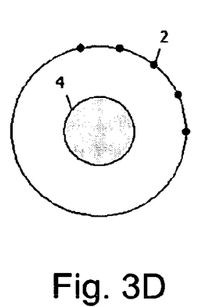

In medical imaging the geometrical arrangements of the X-ray source and digital sensor vary according to the diagnostic task and equipment. FIGS. 3A and 3B illustrate the types of tomographic data resulting from different imaging situations. For clarity, here are presented two-dimensional examples; similar situations can be considered in three dimensions. In the preferred embodiments of the invention, radiation dose is reduced using coarse sampling of the angular variable. FIGS. 3A and 3B present dense angular sampling with full angle and limited angle measurements, respectively. FIGS. 3C and 3D present coarse angular sampling, also with full and limited angles of measurement.

Figure 2A:
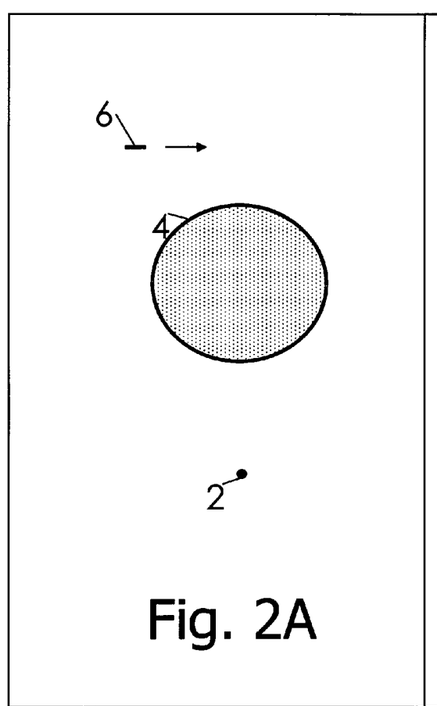
Figure 2B:
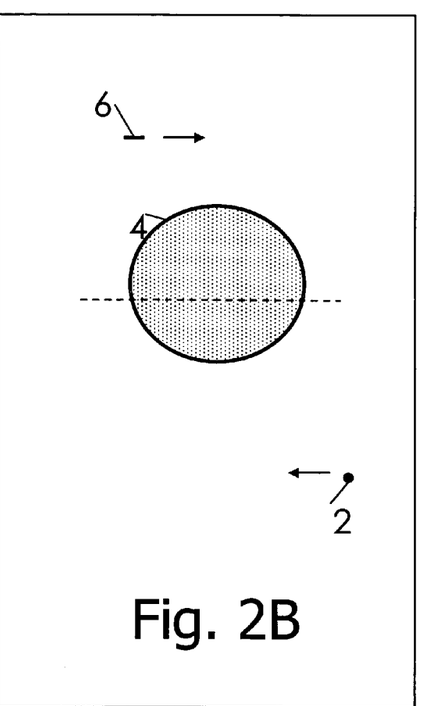
Figure 4:
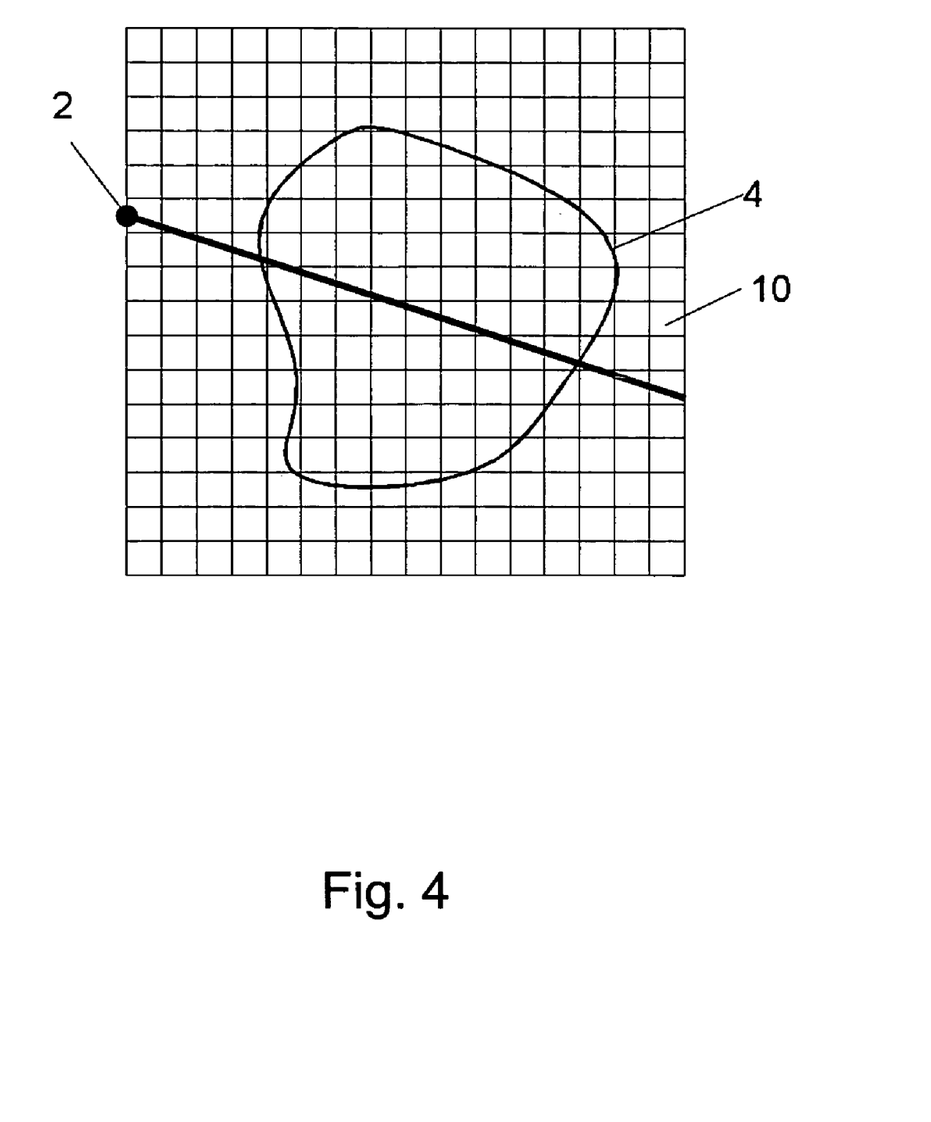
FIG. 4 shows "pencil beam" X-ray attenuation model.

When modeling the measurement mathematically the X-ray attenuation model and the observation can be assumed linear. The model is $$m = Ag + e, \qquad (23)$$

where m represents measured pixel values, g represents the object image vector and e is a random error representing measurement noise. A is a linear operator modeling the X-ray attenuation process. A can model various ways to a collect data. For example, A can model a collection of two or more measurements, where some of the measurements may be traditional projection images, some of the measurements may be scanned projection images, and some of the measurements may be tomosynthetic slices. Traditional projection image is acquired by keeping X-ray source 2, object 4 and detector 6 fixed during the exposure as shown in FIG. 1. Scanned projection image is acquired by keeping X-ray source 2 and object 4 fixed during the exposure while moving detector 6 and its pixels as shown in FIG. 2A. Tomosynthetic slice is acquired by keeping object 4 fixed during the exposure while moving detector 6, its pixels, and X-ray source 2 as shown in FIG. 2B to form an image where a layer inside the object is sharply shown and layers away from the sharp layer are blurred and superimposed. Also, A can model the discrete pencil beam model shown in FIG. 4, or the Radon transform.

The X-ray attenuation coefficient g is always non-negative: the intensity of X-rays does not increase inside tissue. In the invention, the positive part of the attenuation coefficient is modeled by the part of a function that is above the zero level set.

The method is based on solving the non-linear evolution equation $$\partial_t \phi(x,t) = -h(x,t)A^*(A(f(\phi(x,t))) - m) + \alpha P\phi(x,t) \qquad (24)$$

starting from the initial guess $$\phi(x,0) = \phi_0(x)$$

and maintaining a suitable boundary condition for $\phi(x,t)$ for all t and for all x at the boundary of the domain of reconstruction. The boundary condition may be the Dirichlet boundary condition $$\phi(x,t) = 0,$$

Neumann boundary condition $$n \cdot \nabla \phi(x,t) = 0,$$

Robin boundary condition $$n \cdot \nabla \phi(x,t) = \lambda \phi(x,t)$$

or any other boundary condition providing a unique solution for equation (24). Time t runs from 0 onwards, and the solution method is stopped at some positive time t=T>0. Time t does not refer to actual physical time during image acquisition; instead, t refers to non-physical computational time. The function $\phi(x,T)$ then contains three-dimensional information on the object under imaging.

Figure 5:
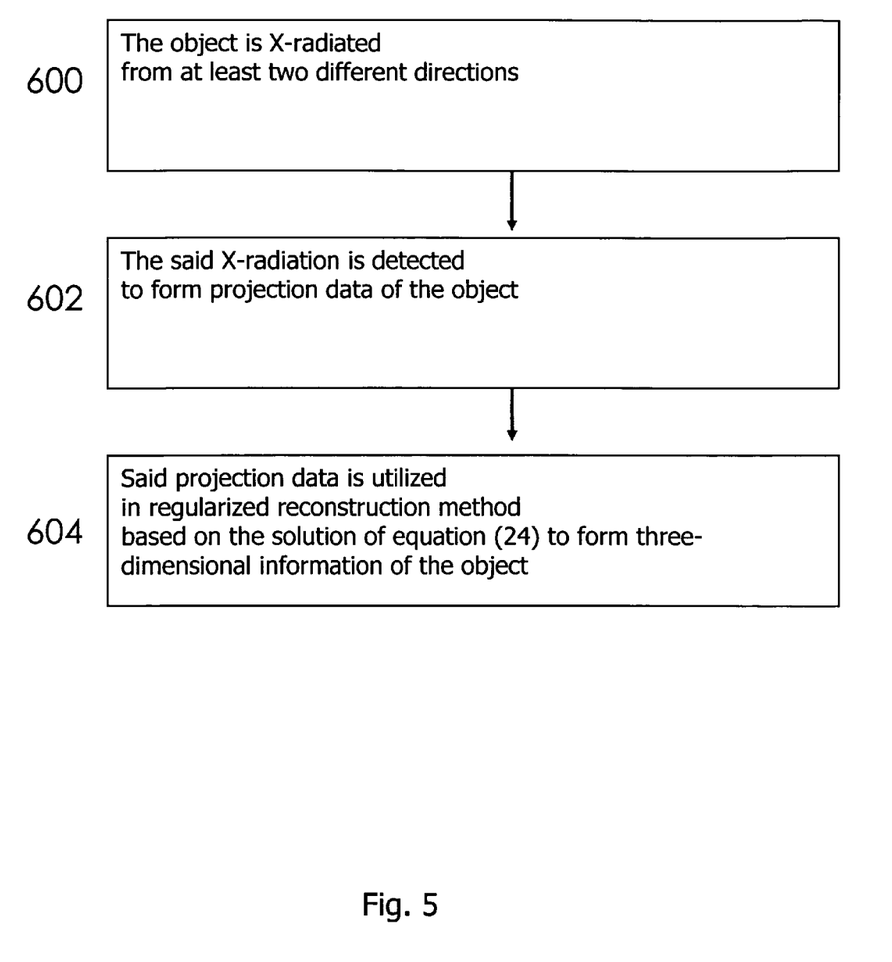
FIG. 5 shows basic flow chart of the method according to the invention.

In FIG. 5 is presented a basic flow chart of the method according to the invention. In method step 600 the object is X-radiated from at least two different directions. In method step 602 the said X-radiation is detected to form projection data of the object. In method step 604 said projection data is utilized in the solution of evolution equation (24) to produce three-dimensional information of the object.

In the first preferred embodiment of the invention is presented an application to dental radiology.

X-ray projection images are conventionally used in dental radiology. However, certain diagnostic tasks require more precise knowledge of the 3D structure of tissue than is available in two-dimensional radiographs.

Figure 6:
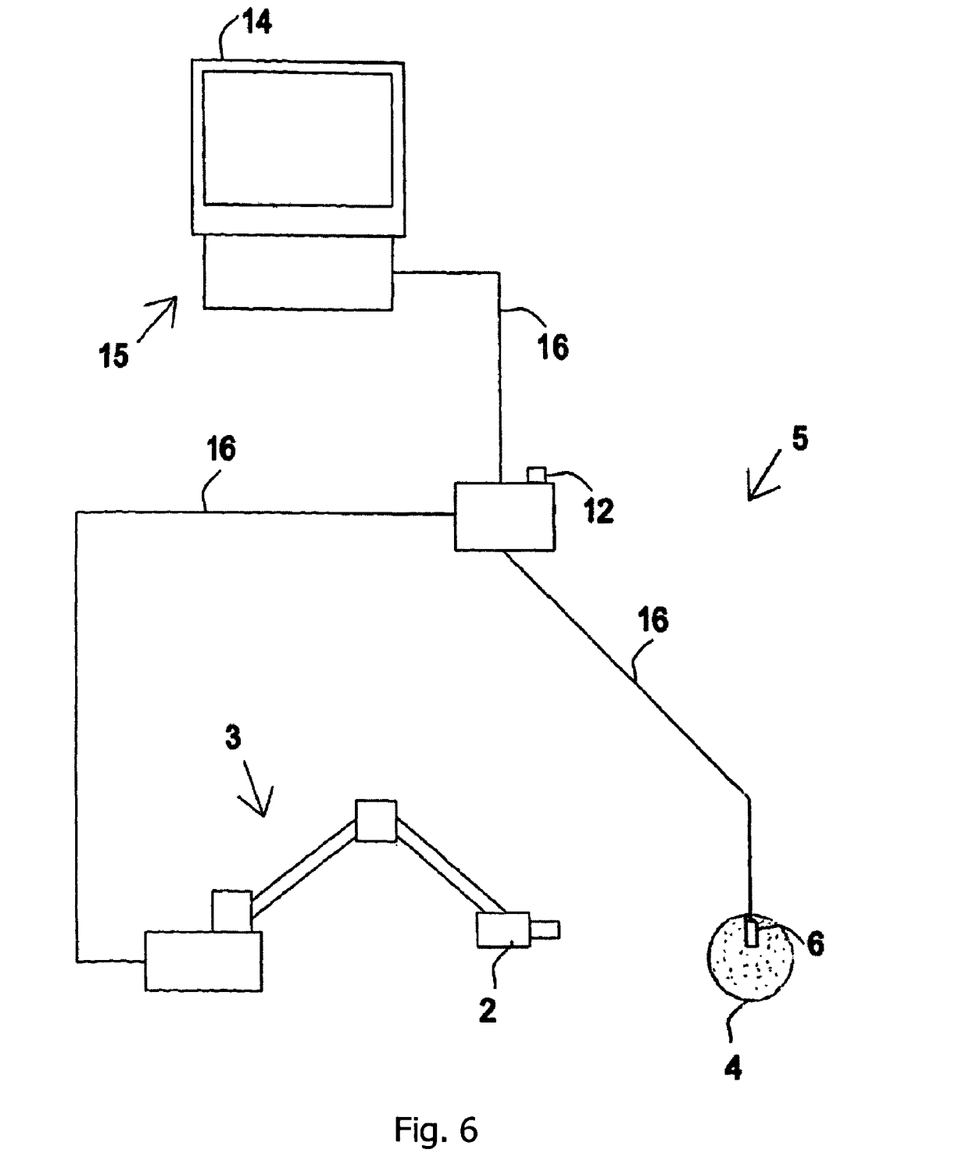
FIG. 6 shows an intraoral X-ray device arrangement presenting one preferred embodiment of the invention.

In FIG. 6 is presented an intraoral X-ray device 5 arrangement presenting the first preferred embodiment of the invention. It is important to notice that this is only an example of the medical X-ray device 5 arrangement where the invention is possible to be utilized. The medical X-ray device 5 in the preferred embodiments of the invention is for example a dental panoramic X-ray device, a surgical C-arm X-ray device, a CT scanner or a mammography device.

The example of the detector 6 used in the first preferred embodiment of the invention is based on charge coupled device (CCD) technology and has dynamic range of 4096 gray levels. The size of the active imaging area is 34 mm*26 mm and the resolution is 872*664 pixels. After exposure, each pixel contains an integer proportional to the number of X-ray quanta that hit the pixel's area.

Alternative detectors include any other digital intraoral sensor, digitized X-ray film, or any intraoral sensing device converting detected X-ray photons to a digital image achieved by detecting the X-radiation is sent by communication link 16 to the computer 14. Two or more X-ray images are taken as described above. The computer comprises the software means 15 to process the image information according to the invention. There can be more than one computer 14 and also the software means 15 can situate in more than one computer 14. For example the first computer 14 is computer which is used in x-ray imaging. The second computer 14 is computer which is used in processing the image information according to the invention. It is possible to have the second computer 14 far away from the actual medical x-ray device 5. For simplicity in FIG. 6 is shown only one computer 14.

Figure 7:
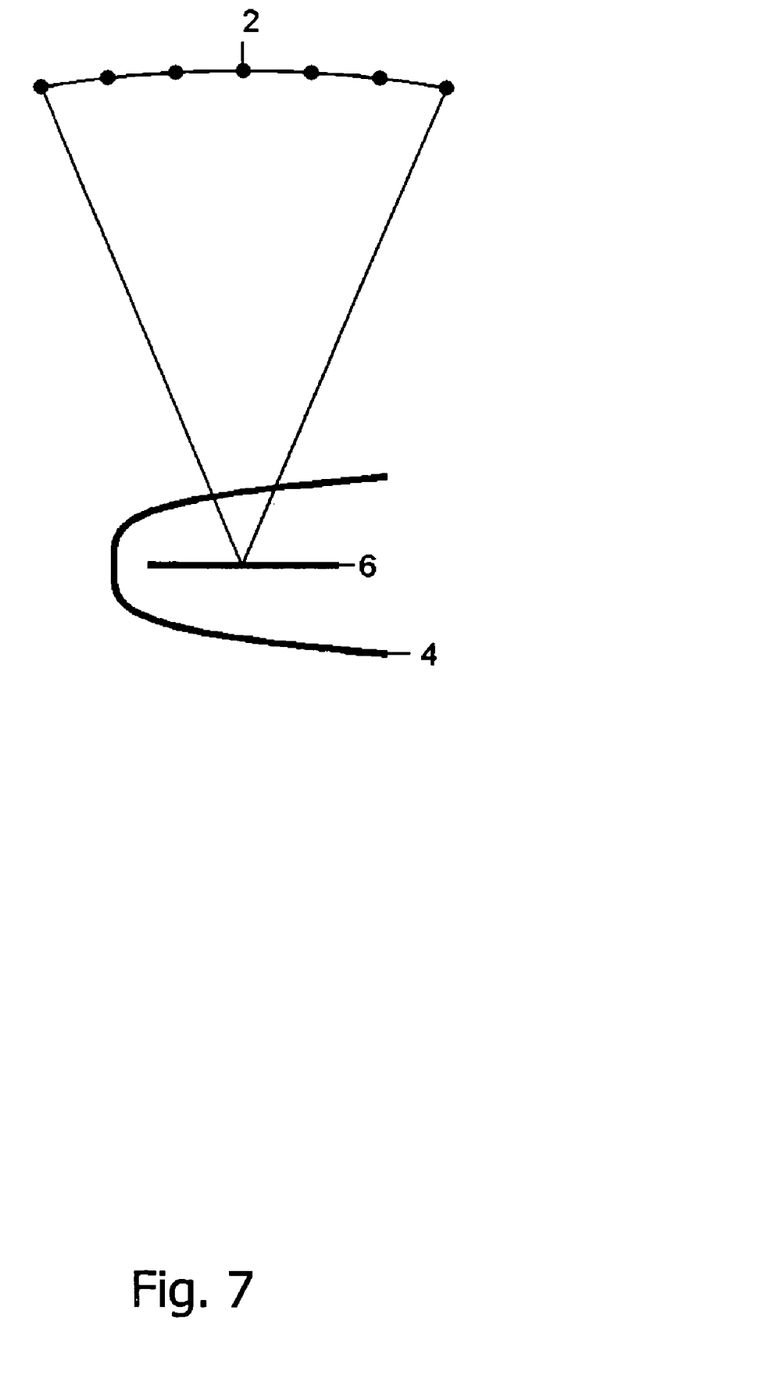
FIG. 7 shows measurement geometry of dental limited-angle tomography with a digital intraoral sensor.

In the first preferred embodiment (FIG. 7) of the invention, the dentist's X-ray equipment is used for taking a set of 2D projection images that are used as input for the reconstruction algorithm based on the solution of the evolution equation (24). Such equipment includes an intraoral X-ray unit and a digital intraoral sensor.

Figure 8:
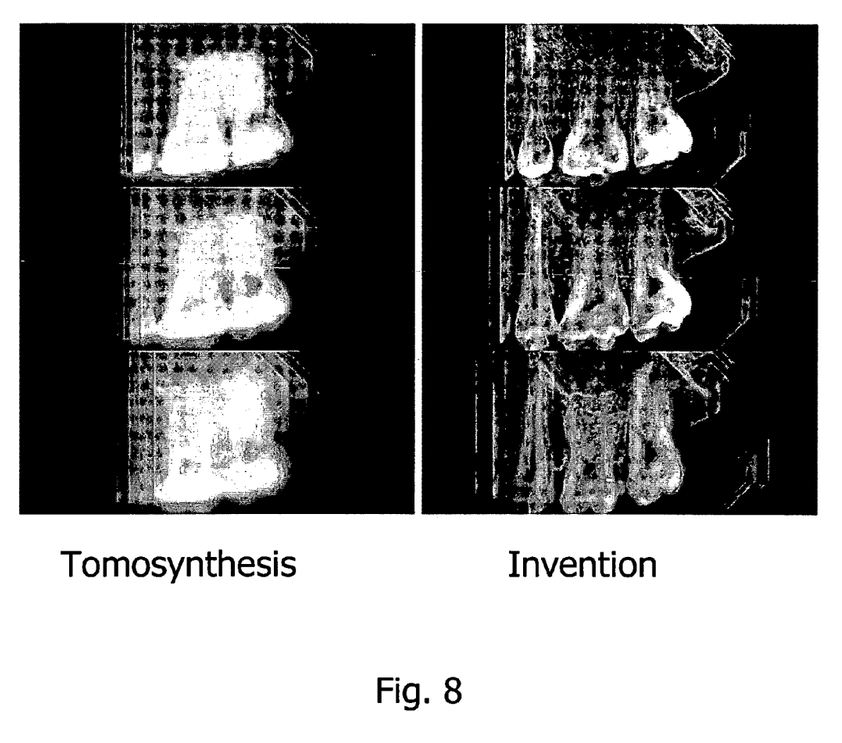
FIG. 8 shows results of 3D reconstruction of head phantom in the first preferred embodiment. Left column: tomosynthetic slices through the teeth of the head phantom. Right column: corresponding slices produced by the invention.

In the preferred embodiments of the invention the three-dimensional problem can be reduced to a stack of two-dimensional problems each corresponding to a plane determined by a constant value of z. Here FIG. 8 represents exactly the situation in the xy plane, i.e. the plane z=0. Each row in the detector corresponds to one such 2D problem.

This approach leads to small approximation error because the X-ray source does not move in the correct plane for nonzero z, and this error is neglected. Next the modeling of a 2D tomographic problem is explained. Let $$m(j) = A\ x(j) + e(j) \qquad (25)$$

denote the jth 2D tomographic problem. Here the vector m(j) contains the readings on jth row from each of the seven radiographs. The vector x(j) is the jth slice of the 3D representation x of the object 4 under imaging. Now x(j) is a 2D array of pixels. In the preferred embodiments, the matrix A comes from the two-dimensional pencil beam model for X-ray attenuation. This is presented in FIG. 4. There the unknown 2D slice of the object 4 is divided into small pixels 10, and the matrix A contains the length of the path of the X-ray inside each pixel.

The computation is next explained for a 2D slice. For simplicity, the slice index j is fixed and not explicitly indicated.

In the preferred embodiments, the function f is a cut-off function that returns zero for negative arguments and identity function for non-negative arguments. The function h(x, t)=1. Also, the high-pass filter P is chosen to be the Laplace operator:

$$P = \Delta = \frac{\partial^2}{\partial x_1^2} + \frac{\partial^2}{\partial x_2^2}$$

Using an explicit Euler method for the discretization of time, equation $$\partial_t \phi(x,t) = -A^*(A(f(\phi(x,t))) - m) + \alpha \Delta \phi(x,t) \qquad (26)$$

with $\square = 0.1$ is solved numerically starting from the initial guess $$\phi(x,0) = \phi_0(x)$$

and maintaining Neumann condition, or the equation $$n \cdot \nabla \phi(x,t) = 0$$

for all times t and for all x at the boundary of the domain of reconstruction. Although explicit Euler method is used for the solution of equation (26), it is to be understood that equation (24) and equation (26) can be solved in many ways within the inventive idea disclosed.

Results from sparse projection data collected from in vitro human head phantom are shown in FIG. 8. Left column shows tomosynthetic slices through the teeth of the head phantom. Right column shows corresponding slices produced by the invention.

Figure 9:
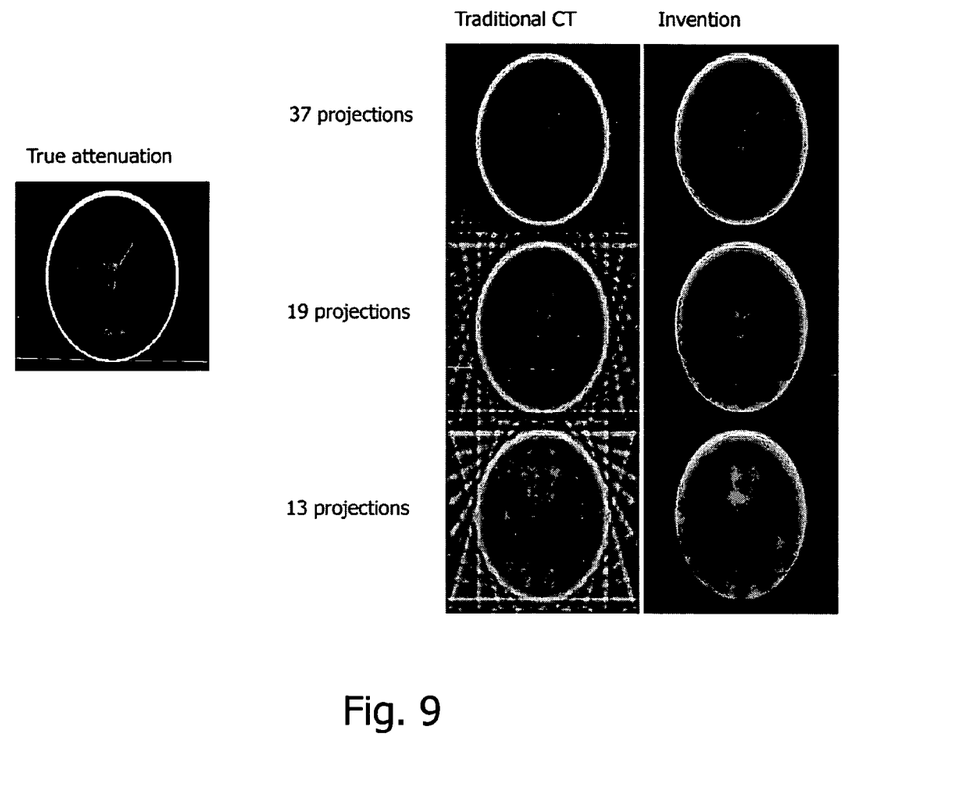
FIG. 9 shows results of 2D reconstruction of a simulated phantom in the second preferred embodiment.

In the second preferred embodiment the invention is utilized in CT imaging. There the object 4 is a two-dimensional cross section of a human body and the medical x-ray device 5 arrangement is CT scanner arrangement. The cross section is X-radiated from a full-angle collection of directions, and the reconstruction is computed analogously to the first preferred embodiment. The result is shown in FIG. 9.

In the first and second preferred embodiments of the invention the basic method steps are same as mentioned with the flow chart in FIG. 5. The utilizing of the invention in the second preferred embodiment is similar to what is described with the first preferred embodiment of the invention and elsewhere in this application except different medical x-ray imaging applications and their differences because of different medical x-ray devices and different objects to be x-ray imaged.

Although the invention is described above with reference to the examples illustrated in the attached figures, it is to be understood that the invention is not limited thereto but can be varied in many ways within the inventive idea disclosed.

What is claimed is:

1. A method for producing three-dimensional information of an object in medical X-ray imaging, the method comprising the steps of:
    x-radiating the object from at least two different directions;
    detecting said x-radiation to form projection data of the object;
    utilizing said projection data in a regularized reconstruction method based on solving the non-linear evolution equation $$\partial_t \phi(x,t) = -h(x,t)A^*(A(f(\phi(x,t)))-m) + \alpha P \phi(x,t)$$

to produce three-dimensional information of the object, x representing the coordinates inside the object under imaging, t representing time, φ representing a level set function indicating the boundary of the object, h representing a positive-valued function, m representing projection data, the operator A representing the X-radiation attenuation model, A* representing the backprojection operator, α representing a positive number, P representing high pass filtering, and f representing a cut-off function returning zero for non-positive arguments and positive values for positive arguments; and
    producing three-dimensional information of the object.

2. A method according to claim 1, characterized in that the three-dimensional information of the object is one or more two-dimensional images representing X-ray attenuation coefficient along slices through the object.

3. A method according to claim 1, characterized in that the three-dimensional information of the object is a three-dimensional voxel representation of the X-ray attenuation in the object.

4. A method according to claim 1, characterized in that, the x-ray attenuation inside the object is given by f(φ).

5. A method according to claim 1, characterized in that the three-dimensional information of the object is given by representing the boundary between zero and nonzero attenuation value by the curve where φ has zero value.

6. A method according to claim 1, characterized in that the evolution equation is solved using explicit Euler method.

7. A method according to claim 1, characterized in that the measurement data m consists of two or more projection images, of which none or more being traditional projection images, none or more being scanned projection images and none or more being tomosynthetic slices.

8. A method according to claim 1, characterized in that the high-pass filter P is discretized Laplace operator.

9. A method according to claim 1, characterized in that the high-pass filter P is the discretization of any elliptic differential operator.

10. A method according to claim 1, characterized in that the boundary condition making the solution of the evolution equation unique at fixed time is the Dirichlet boundary condition.

11. A method according to claim 1, characterized in that the boundary condition making the solution of the evolution equation unique at fixed time is the Neumann boundary condition.

12. A method according to claim 1, characterized in that the boundary condition making the solution of the evolution equation unique at fixed time is the Robin boundary condition.

13. A method according to claim 1, characterized in that the function f is determined by returning zero for negative real number arguments and returning f(y)=y for non-negative real number arguments y.

14. A method according to claim 1, characterized in that the attenuation model A is two-dimensional or three-dimensional pencil beam model.

15. A method according to claim 1, characterized in that the attenuation model A is two-dimensional or three-dimensional Radon transform.

16. A method according to claim 1, characterized in that the three-dimensional information of the object is one or more two-dimensional images representing X-ray attenuation coefficient along slices through the object.

17. A method according to claim 1, characterized in that the three-dimensional information of the object is a three-dimensional voxel representation of the X-ray attenuation in the object.

18. A method according to claim 1, characterized in that the x-ray attenuation inside the object is given by f(φ).

19. A method according to claim 1, characterized in that the three-dimensional information of the object is given by representing the boundary between zero and nonzero attenuation value by the curve where α has zero value.

20. A method according to claim 1, characterized in that the evolution equation is solved using explicit Euler method.

21. A method according to claim 1, characterized in that the measurement data m consists of two or more projection images, of which none or more being traditional projection images, none or more being scanned projection images and none or more being tomosynthetic slices.

22. A method according to claim 1, characterized in that the high-pass filter P is discretized Laplace operator.

23. A method according to claim 1, characterized in that the high-pass filter P is the discretization of any elliptic differential operator.

24. A method according to claim 1, characterized in that the boundary condition making the solution of the evolution equation unique at fixed time is the Dirichiet boundary condition.

25. A method according to claim 1, characterized in that the boundary condition making the solution of the evolution equation unique at fixed time is the Neumann boundary condition.

26. A method according to claim 1, characterized in that the boundary condition making the solution of the evolution equation unique at fixed time is the Robin boundary condition.

27. A method according to claim 1, characterized in that the function f is determined by returning zero for negative real number arguments and returning f(y)=y for non-negative real number arguments y.

28. A method according to claim 1, characterized in that the attenuation model A is two-dimensional or three-dimensional pencil beam model.

29. A method according to claim 1, characterized in that the attenuation model A is two-dimensional or three-dimensional Radon transform.

30. A medical X-ray device arrangement for producing three-dimensional information of an object in a medical X-ray imaging, the medical X-ray device arrangement comprising:

an X-ray source for X-radiating the object from at least two different directions;

a detector for detecting the X-radiation to form projection data of the object; and means for utilizing said projection data in a regularized reconstruction method based on solving the non-linear evolution equation $$\partial_t \phi(x,t) = -h(x,t) A^*(A(f(\phi(x,t))) - m) + \alpha P \phi(x,t)$$

to produce three-dimensional information of the object, x representing the coordinates inside the object under imaging, t representing time, $\phi$ representing a level set function indicating the boundary of the object, h representing a positive-valued function, m representing projection data, the operator A representing the X-radiation attenuation model, $A^*$ representing the backprojection operator of A, $\alpha$ representing a positive number, P representing high pass filtering, and f representing a cut-off function returning zero for non-positive arguments and positive values for positive arguments.

* * * * *